INVENTORS
ROGER K. BRUCE
ROBERT S. WAITE
BY
ATTORNEY

INVENTORS
ROGER K. BRUCE
ROBERT S. WAITE
BY
ATTORNEY

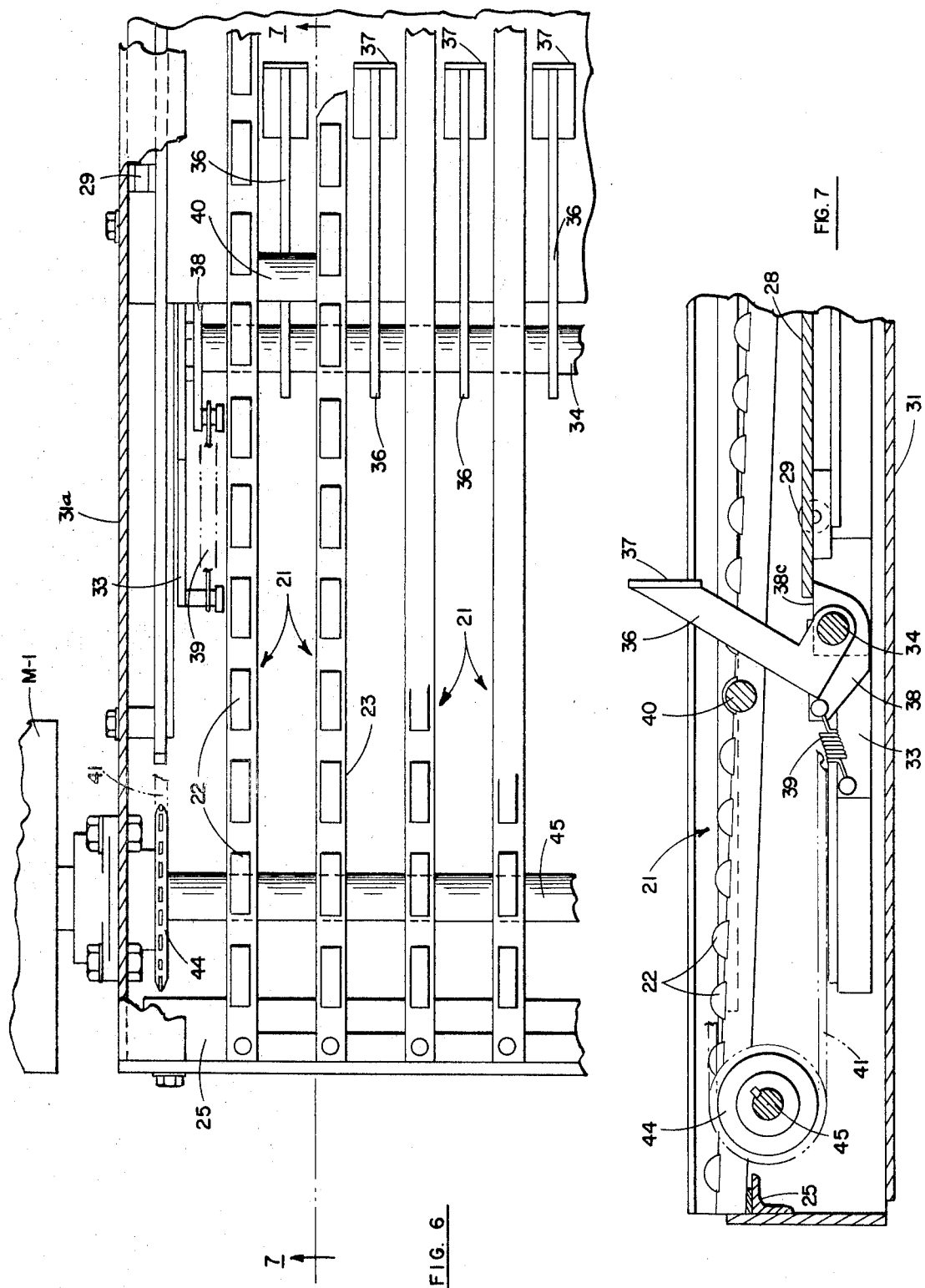

INVENTORS
ROGER K. BRUCE
ROBERT S. WAITE
BY
ATTORNEY

July 14, 1970  R. K. BRUCE ET AL  3,520,422
ARTICLE STACKER

Original Filed March 7, 1966  12 Sheets-Sheet 7

INVENTORS
ROGER K. BRUCE
ROBERT S. WAITE
BY
ATTORNEY

INVENTORS
ROGER K. BRUCE
ROBERT S. WAITE
BY
ATTORNEY

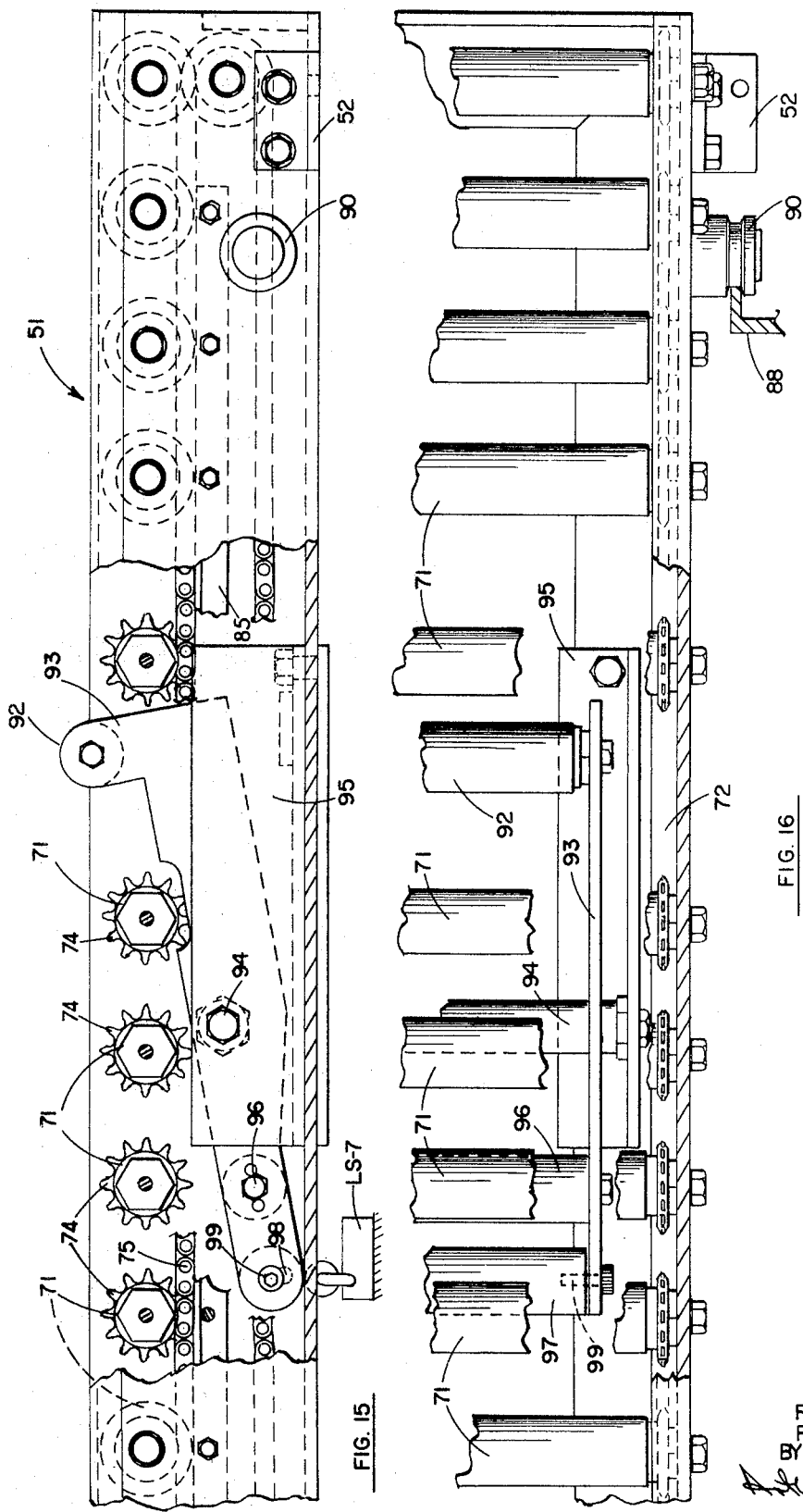

United States Patent Office 3,520,422
Patented July 14, 1970

3,520,422
ARTICLE STACKER
Roger K. Bruce, North Hollywood, Calif., and Robert S. Waite, Madison, Conn., assignors to Tridair Industries, Redondo Beach, Calif., a corporation of California
Continuation of application Ser. No. 532,286, Mar. 7, 1966. This application Oct. 25, 1968, Ser. No. 770,870
Int. Cl. B65g 57/10, 57/24
U.S. Cl. 214—6
14 Claims

ABSTRACT OF THE DISCLOSURE

This disclosure describes an article stacking machine which includes a makeup deck on which a layer of articles can be formed, a movable stacking deck mounted adjacent the ejection end of the makeup deck, and a stripper assembly for moving the layer of articles from the makeup deck to the stacking deck. The stacking deck is lowerable incrementally to allow successive layers from the makeup deck to be moved thereon to form the desired stack. The stacking deck supports a pallet or other article unitizing means. The loaded pallet can be automatically removed from the stacking deck when the stacking deck reaches the lowermost position, and an empty pallet is then supplied to the stacking deck.

This invention relates to machines for stacking containers, boxes or other articles in patterned tiers and is more specifically concerned with a semi-automatic machine for economically and efficiently placing patterned layers or tiers of containers or other articles in a stack, which may then be removed from the machine by a clamp truck or delivered to a conveyor. It also relates to a machine for stacking tiers of articles or cases on a pallet and delivering the loaded pallet onto a conveyor.

This application is a continuation of application Ser. No. 532,286 for Article Stacker, filed Mar. 7, 1966, now abandoned.

Fully-automatic palletizers of current manufacture are designed to automatically form repetitive patterns of containers or other articles to place them on a pallet and to then deliver the loaded pallet to a conveyor. In order to provide any flexibility whatever of pattern design, such palletizers must have complex programming sections and generally require complex machines for forming the individual tiers on the pallets.

On the other hand, semi-automatic palletizers, although not generally capable of pallet loading without some manual assistance, have marked advantages in some environments. They are substantially less costly than fully-automatic palletizers; they are capable of providing for a greatly-increased flexibility of pattern design and they permit inspection (at the palletizing location) of the condition of the containers or articles being palletized. In some instances, these functions can be performed by simply transferring a man from the conveyor line to the palletizer operation.

Semi-automatic palletizers known to the art generally do not have the ability to palletize as rapidly as do fully-automatic palletizers. In known semi-automatic palletizers, each individual tier of containers or articles must be placed on the pallet before the next subsequent tier is formed. Other sequential operations similarly can not be initiated in some machines until the immediately preceding operation has been completed. This results in a considerable delay in action of the machine and limits the efficiency of the operator and of the machine.

In addition, the palletizers of the prior art have generally required complex mechanisms to form individual layers of articles and to transfer them to a surface from which the resulting stack of containers can be removed. Such mechanisms are difficult to maintain and are, because of their complexity, unreliable in many environments.

It is, therefore, a principal object of our invention to provide a semi-automatic stacker of simple design which is simple to operate, requires little maintenance and provides for rapid, efficient stacking or palletizing operations.

It is another object of our invention to provide a semi-automatic stacker that permits delivery of a tier of containers or other articles to a stack or pallet concurrently with makeup of the next subsequent tier and a consequent increase in machine and operator efficiency and speed.

It is a further object of our invention to provide a semi-automatic palletizer that utilizes a common drive mechanism for actuating a pallet elevator or lowerator and a load elevator or lowerator to deliver a loaded pallet from the machine at the same time as a new pallet is delivered into position ready for loading.

An additional object of our invention is to provide friction stop means for the layer makeup deck to eliminate the need for a mechanically-actuated device for retaining the individual tiers on the makeup deck of the machine prior to delivery of the tier to the pallet.

Still a further object of our invention is to provide apparatus that requires only a single power source to drive a layer or tier of containers or articles out over a pallet onto a stripper plate and then to strip the tier from the plate onto the pallet.

A further object of our invention is to provide a semi-automatic stacker that can be combined with a programming and row-forming mechanism to provide for fully-automatic stacking or palletizing. We also desire to provide component structures that are applicable to fully-automatic palletizer machines.

It is still another object of our invention to provide a stripper plate layer makeup deck structure that can be used with a load lowerator to give semi-automatic article stacking.

The foregoing and other objects of our invention will be evident from a consideration of the following specification disclosing the features of our invention applied to a palletizer, as related to the drawings in which:

FIG. 6 is an enlarged fragmentary plan view of a portion of the layer buildup deck;

FIG. 7 is an enlarged fragmentary section taken on the lines 7—7 of FIG. 6, but showing the ejector rake in a fully-extended position;

FIG. 15 is a fragmentary side elevation, partly in section, of the load lowerator showing the stop roller assembly;

FIG. 16 is a fragmentary top plan view, partly in section, of the load lowerator showing the stop roller assembly;

Figure 23:
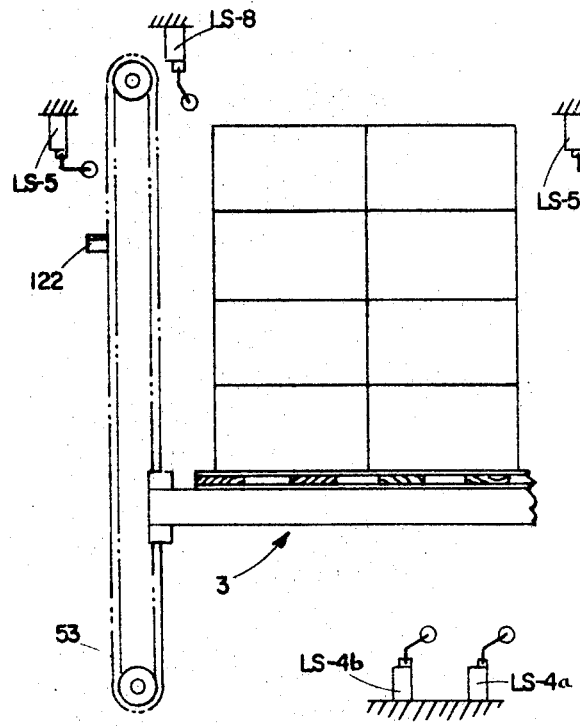
Figure 24:
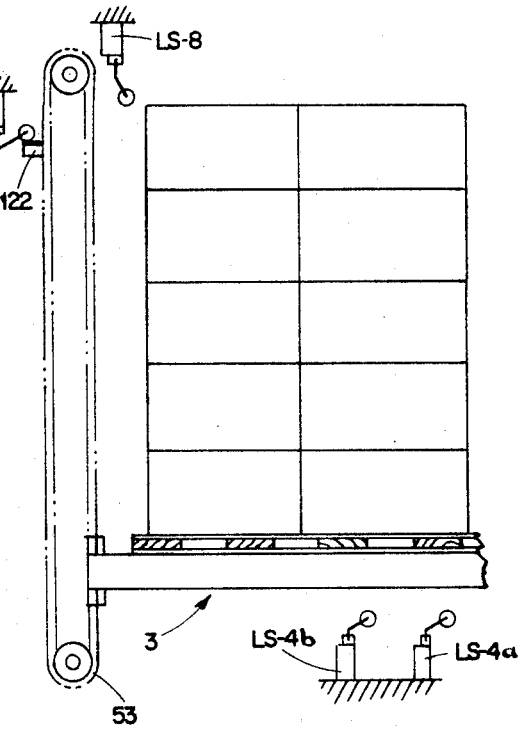
Figure 25:
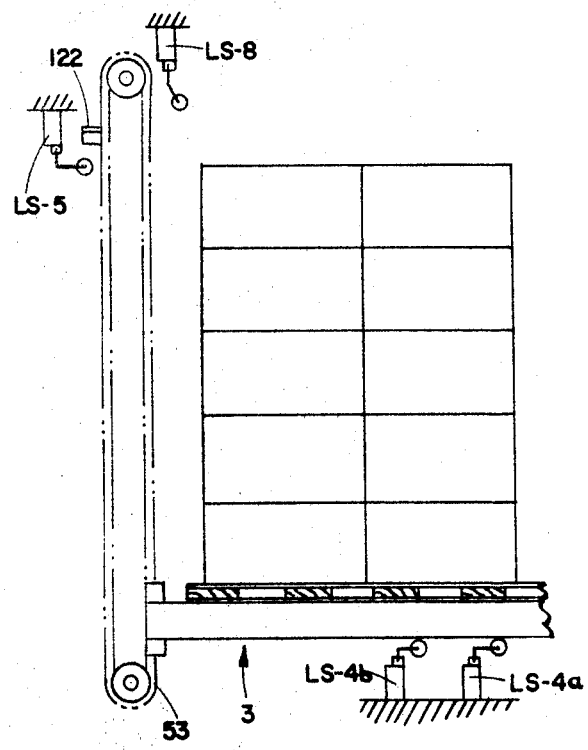
Figure 26:
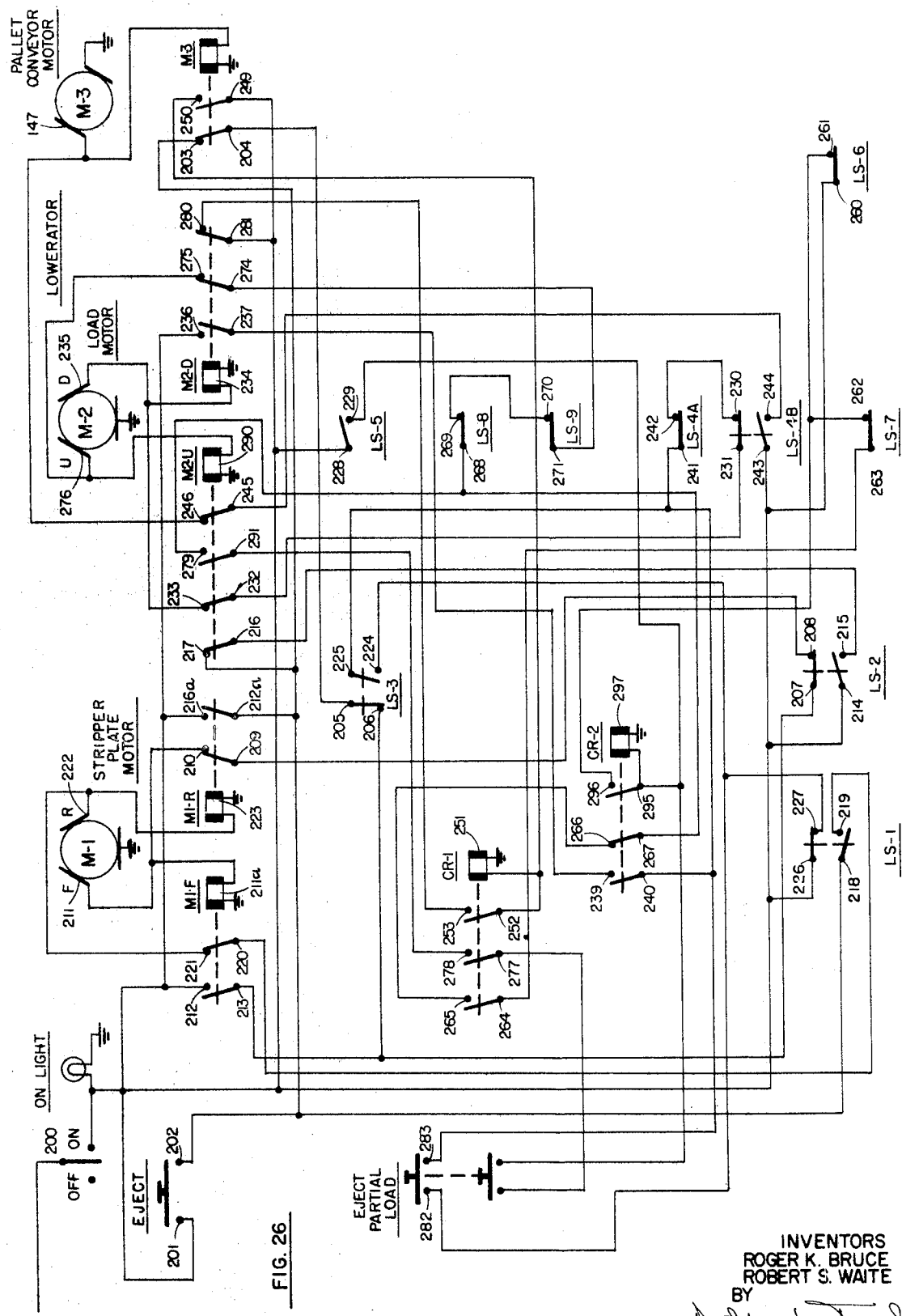

FIGS. 17 thru 22 are schematic side elevations showing the load ejection switches activated in progressive positions by a fully-loaded pallet and by an empty pallet;

FIGS. 23 thru 25 are schematic side elevations showing progressive positions of the partly-loaded and fully-loaded pallet in relationship to the load lowerator motor switch, and FIG. 26 is a circuit diagram of our palletizer. In general, the palletizer of our invention comprises a low-friction deck such as the ball deck 1 shown in FIGS. 2 and 3 to which the conveyor 6 delivers cartons or other articles to be palletized; the tier or layer makeup deck 2 from which the tiers or layers are delivered to the load lowerator 3 by the stripper plate assembly 4 and the pallet lowerator assembly 5. These assemblies and components are mounted in the frame 7, which generally comprises the side plates 8 and 8a, intermediate side plates 31 and 31a, and end plates 9 and 10. Depending upon the height of the load which it is desired to palletize and the location of the palletizer in the plant, the ball deck of the palletizer may be provided with an operator's platform 11, which is reached by the stairs 12.

The ball deck or low friction multi-direction conveyor 1 may be constructed of a plurality of rotatable balls 13 appropriately mounted in bushings. A push bar 14, to which is secured a lateral handle 15, is pivotally connected by the pins 16 and the rods 17 through the end brace 18, which is affixed to the end plate 10.

Figure 2:
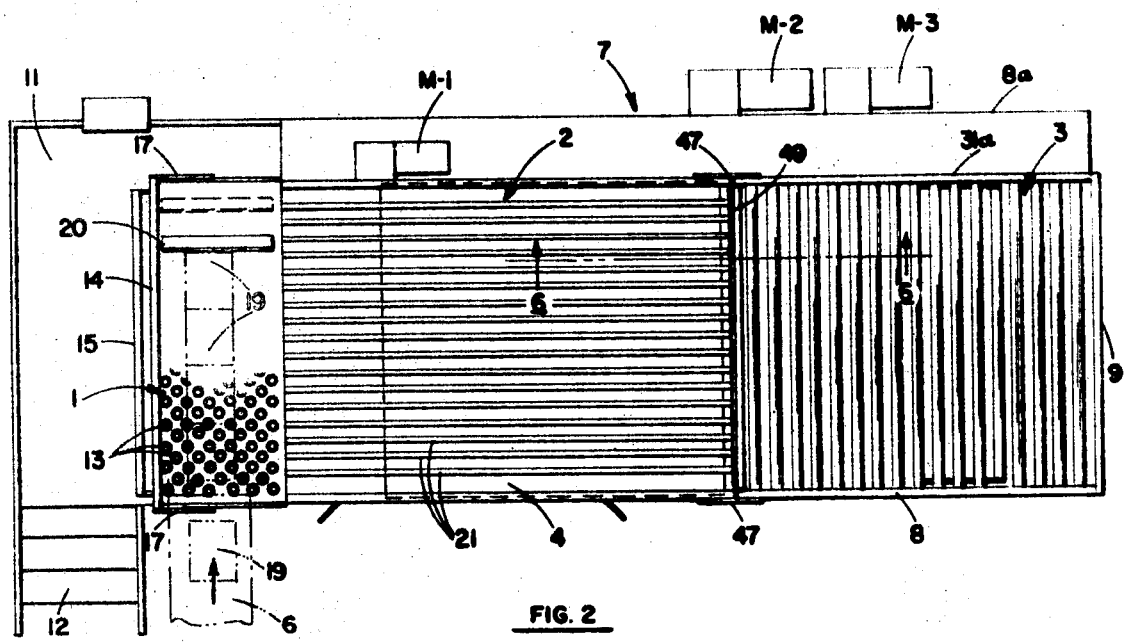
FIG. 2 is a top plan view of our palletizer.

As can be seen in FIG. 2, the containers 19 enter the palletizer by the conveyor 6 and are positioned against the brace 20, secured to the ball deck 1 in any suitable fashion. When a complete row of containers is in position, as shown in FIG. 2, the operator manually urges the horizontal push bar against the containers to move them onto the layer makeup deck 2. This deck is comprised of a plurality of parallel, spaced skate wheel strips 21, which are of conventional structure, having rotatable wheels 22 mounted in bushings, not shown, in the side flanges 23 of such strips.

With reference to FIGS. 6, 7, 11 and 12 the layer makeup deck 2 may be provided with a very slight slope so that the containers 19 will roll on the deck until their forward motion is stopped by the plurality of friction stops 24, comprising strips of metal secured to each of the skate wheel strips 21 at the end of said strips. The stops have upper surfaces that lie sufficiently above the plane of the container contact plane of the rotatable wheels 22 to cause said containers to stop their forward motion without comprising an abstruction to the containers being driven over said strips.

Figure 8:
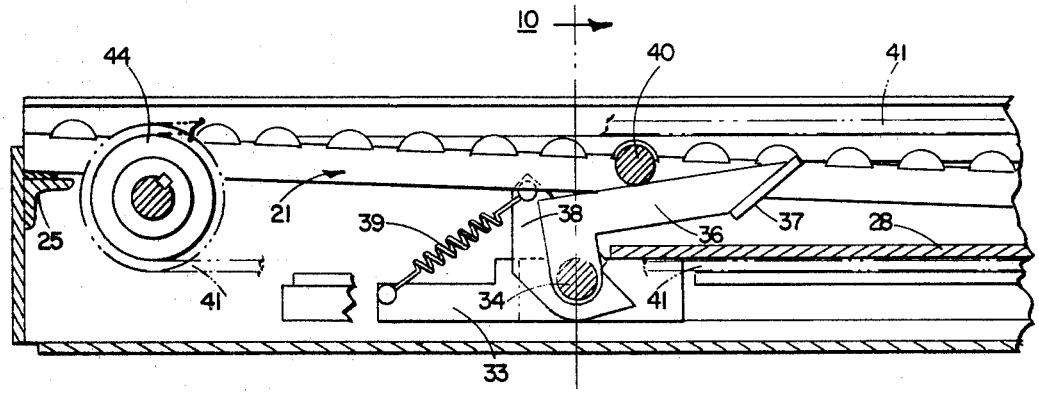
FIG. 8 is a fragmentary section of the ejector rake also taken on the line 7—7 of FIG. 6, but showing the ejector rake in a fully-retracted position.
Figure 11:
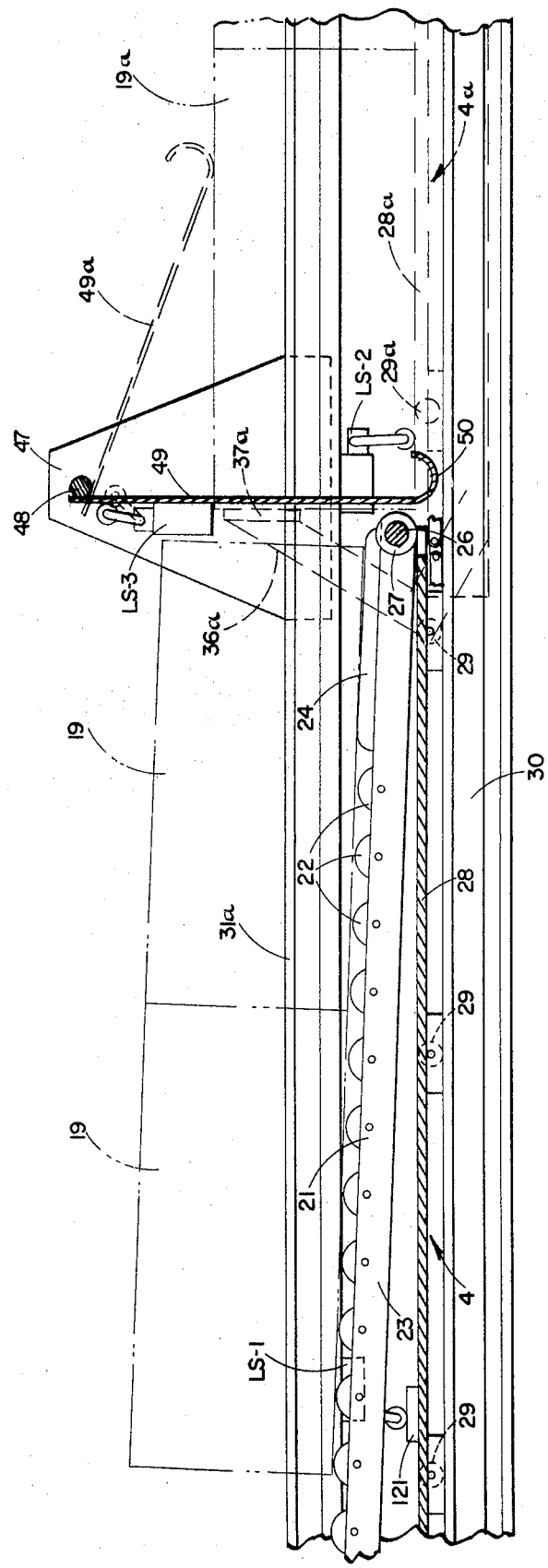
FIG. 11 is an enlarged fragmentary section of the layer buildup deck showing the load height pendant and switch in full up and full down positions.
Figure 12:
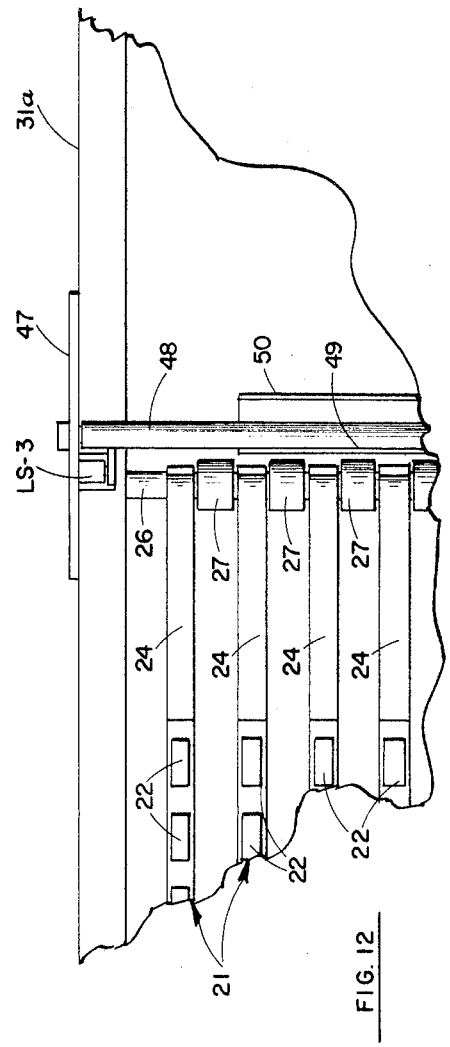
FIG. 12 is an enlarged fragmentary plan view showing a portion of the layer buildup deck and pendant.

As can be seen in FIG. 8, each of the skate wheel strips 21 is secured at the ball deck end of the machine by means of the flange 25, or by other suitable means and, as seen in FIGS. 11 ond 12, to the frame of the palletizer by the tie rod 26. Rotatably mounted upon the tie rod 26, intermediately each of the adjacent skate wheel strips 21, are the rollers 27.

Figure 1:
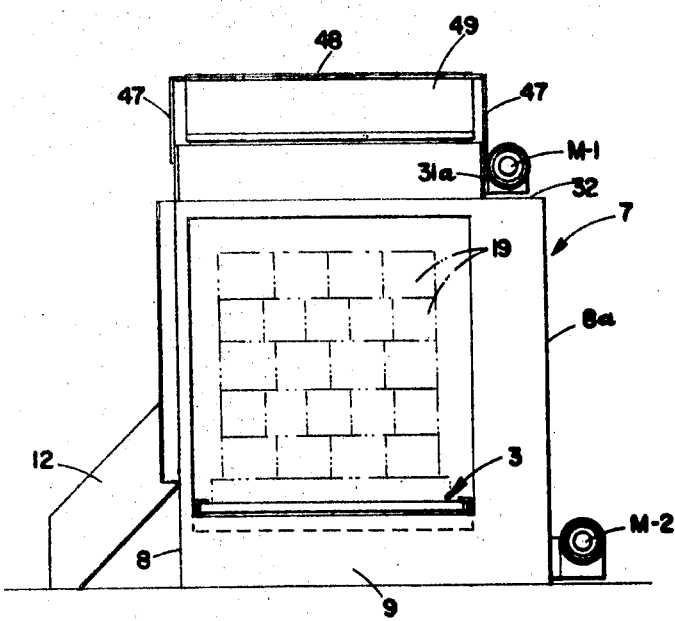
FIG. 1 is an end elevation of a palletizer of our invention showing the ejection end of the palletizer with a loaded pallet thereon.
Figure 9:
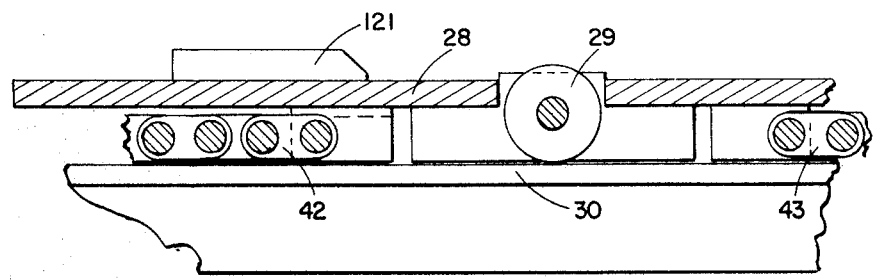
FIG. 9 is a fragmentary section of the stripper plate.
Figure 10:
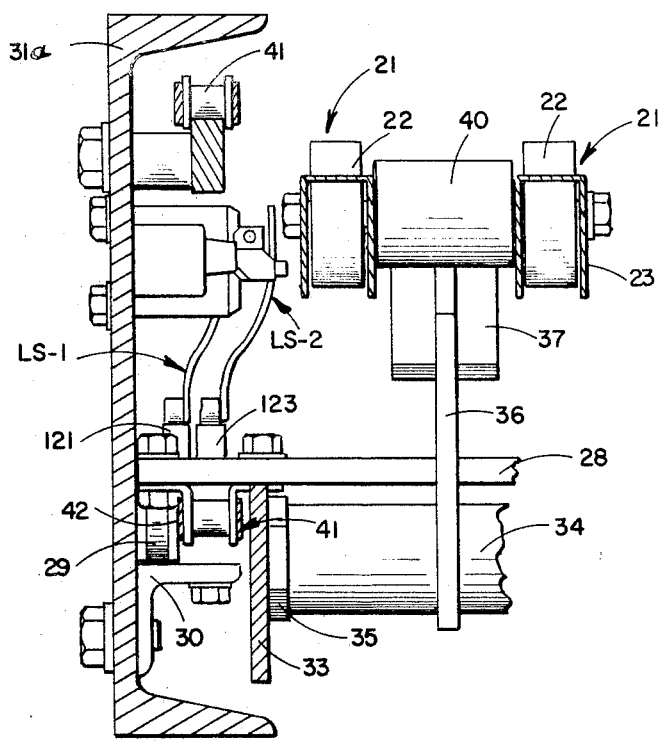
FIG. 10 is an enlarged fragmentary section of the layer buildup deck with the stripper plate and ejector rake taken on line 10—10 of FIG. 8.

A stripper plate 28 is positioned immediately adjacent and below the tier or layer makeup deck 2. The stripper plate is provided with rollers 29 along oppositely disposed sides thereof. As best seen in FIGS. 9, 10 and 11, these rollers ride on a pair of "L" flanges 30, one of which is secured to the side plate 8 an the other of which is secured to intermediate side plate 31a, which is spaced interiorly of the opposite side plate 8a and fixed thereto by the horizontal plate 32 (as seen in FIGS. 1 and 3).

Secured to the back edge of stripper plate 28 as by the oppositely disposed side strips 33, is the ejector rake assembly comprising a lateral shaft 34 parallel to the plane of the stripper plate and pivotally mounted to each of the side strips 33, as by the bushings 35. A plurality of rake arms 36 are secured to the shaft 34. Each of the rake arms 36 may be provided with a pusher plate 37, secured to the end of the rake arms. Each of the plates 37 serves to provide a flat surface for urging the containers forwardly. A spring arm or plate 38 is also secured to the lateral shaft 34. A tension spring 39, secured to one end of the spring arm 38 and to the end of the strip 33, urges the shaft 34 in a counter-clockwise direction as seen in FIG. 8 and thus urges the rake arms 36 into an extended position above the level of the skate wheel strips 21. In the normal retracted position of the stripper plate, the rake arms are urged downwardly below the plane of the skate wheels 22 by the stub rods 40, which are secured in one or more locations to opposite edges 23 of the adjacent skate wheel strips 21.

Figure 3:
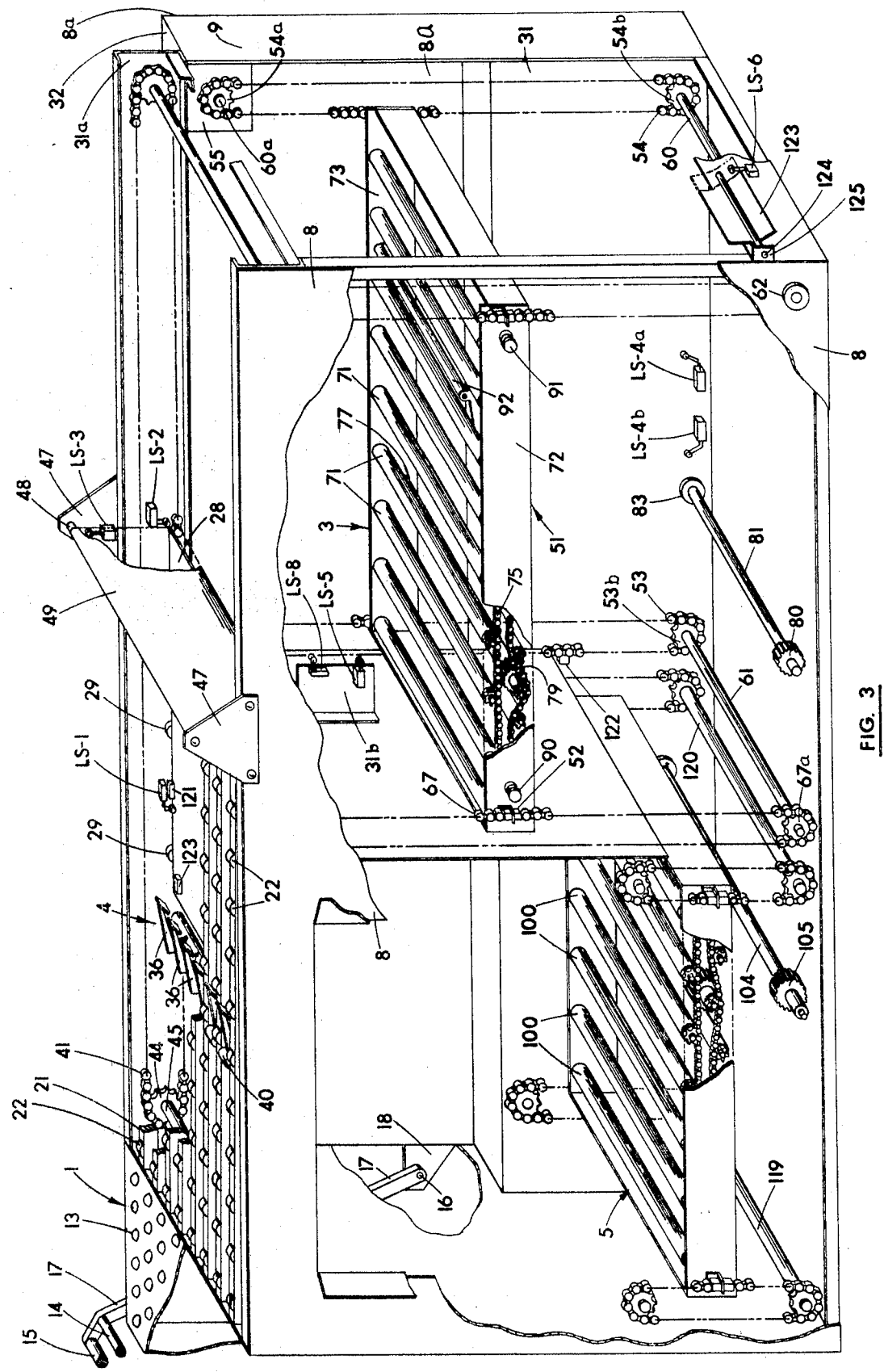
FIG. 3 is a perspective view of our palletizer with parts cut away for clarity.

The stripper plate 28 and its attached ejector rake arms 36 are driven forwardly (to the right as seen in FIG. 3) by the drive chain 41, secured (as shown in FIG. 9) at its ends 42 and 43 to the side of the stripper plate 28. The chain 41 is driven by the sprocket 44, which is affixed to the shaft 45. The latter shaft is rotated by the stripper plate drive motor M-1. It will be noted that when the sprocket 44 is rotated in a counterclockwise direction as seen in FIG. 7, the drive chain will cause the stripper plate 28 to travel in ejecting direction (to the right as seen in FIG. 7). As the stripper plate 28 is extended, the ejector rake arms 36 are urged into an extended position by the tension spring 39. As soon as the stripper plate has extended beyond the point where the stub rods 40 can contact the ejector rake arms 36, the ejector rake arms will be fully extended so that edge 38c of spring arm 38 abuts against the end of plate 28 and stops the rake arms in fully extended position. The arms are then in a position to push the containers 19 over the end rollers 27 and onto the stripper plate 28. In a fully-extended position of the stripper plate, as seen in phantom in FIG. 11, all of the containers in a tier will be resting on the stripper plate in the same relative position they occupied while resting on the tier or layer buildup deck. In FIG. 11, the stripper plate, ejector arms, pusher plate and other elements shown in phantom are given an "a" designation as for example 19a, 28a, 29a, 36a and 37a.

Secured to the side plates 8 and 31a, at the end of the layer buildup deck, are vertical pendant support plates 47 to which are pivotallly mounted the pendant support shaft 48. Secured to and depending from this shaft is the pendant plate 49, which is provided with an arcuate end segment 50. It will be seen that the pendant plate, in its normal position, as seen in FIG. 11, is so positioned as to depend in a vertical position adjacent to the end of the deck. End segment 50 extends to a vertical position of contact with the stripper plate 28 so that the pendant plate can be pivoted by the stripper plate in the event it is desired to operate the stripper plate when it is empty.

The structure of the load lowerator assembly is illustrated in FIGS. 3, 5, 13–16 and 23–25. The load lowerator assembly 3 generally comprises a lateral frame 51 secured in any suitable manner, as by the bolts and C-clips 52 to a pair of spaced drive chains 53 and 54. Chain 54 engages vertically-spaced sprockets 54a and 54b, which are respectively secured to the drive shaft 60 and to the stub shafts 60a. Drive shaft 60 is journaled in bushings 62 and 69 to side plate 8 and side plate 31 at a vertical position at the bottom of the palletizer, while the stub shaft 60a is journaled in bushings, not shown, to a plate 55 secured to end plate 9.

Chain 53 similarly engages vertically-spaced sprockets, only the lowermost one of which, 53b, is shown. This sprocket is secured to drive shaft 61, journaled in bushings 63 and 70 to side plate 8 and intermediate plate 31. The upper sprocket of this pair is similar to 54a and is journaled to a depending plate similar to plate 55 affixed to plate 31a. As will be seen from FIG. 5, the drive shafts 60 and 61 are driven by the load lowerator motor M–2 by means of the drive chains 56 and 57. These chains engage sprocket 58 and 59, respectively secured to the drive shafts 60 and 61. Chains 56 and 57 are driven by sprockets 64 and 65, which are in turn secured to the drive shaft 66 of the motor M–2.

The other side of the lateral frame 51 is also secured, as by bolts and C-clips 52, to the pair of spaced drive chains 67 and 68, which engage vertical-spaced sprockets similar to the sprockets 54a and 54b. The sprocket 67a is secured to drive shaft 61.

Figure 13:
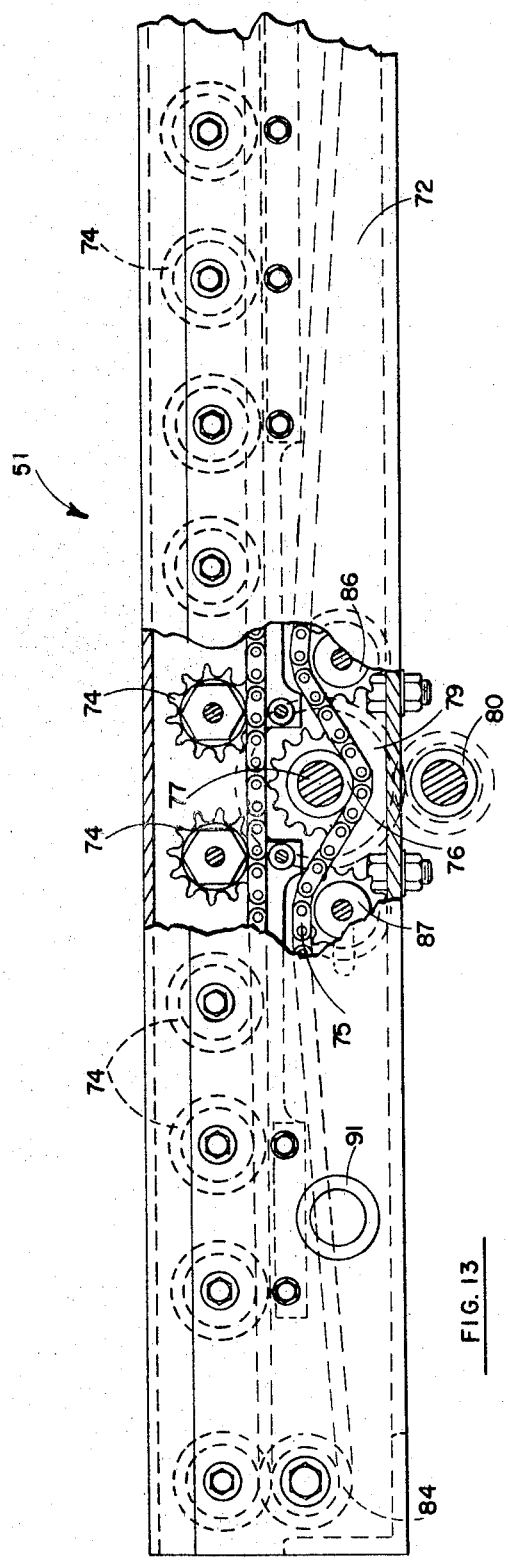
FIG. 13 is an enlarged fragmentary side elevation, partly in section, of the load lowerator drive rollers and drive means.

The load lowerator is provided with a plurality of parallel lateral rollers 71, which are secured for rotation in the side plates 72 and 73 of the lateral frame 51. Each of said rollers 71 is provided with a sprocket 74, adjacent one end of the roller. The rollers are driven by drive chain 75, which engages each of said sprockets 74. The chain 75 is itself driven by a sprocket 76, affixed to the end of the shaft 77 journaled for rotation in the bushings 78, which are secured in the side plate 72 and 73 of lateral frame 51. A gear 79 is also secured to the shaft 77. The gear 79 is driven by drive gear 80, secured to the shaft 81, journaled for rotation in bushings 82 and 83, which are secured to the side plates 8 and 31. As will be seen from FIG. 5, the shaft 81 is driven by pallet conveyor motor M–3. As shown in FIG. 13 the load lowerator is shown in its full down position, so that drive gear 80 meshes with and drives gear 79.

Suitable idler sprockets 84 are provided at opposite ends of the lateral frame 51 in such positions that the drive chain 75 engages each of the sprockets 74 of the rollers 71. An additional pair of sprockets 86 and 87 are disposed on opposite sides of the sprocket 76 and engage the opposite side of chain 75 in order to provide position driving action for said chain. Secured to the side plates of load lowerator frame 51 are chain support strips 85 upon which the chains 75 ride and which urge these chains into engagement with sprockets 74.

Figure 14:
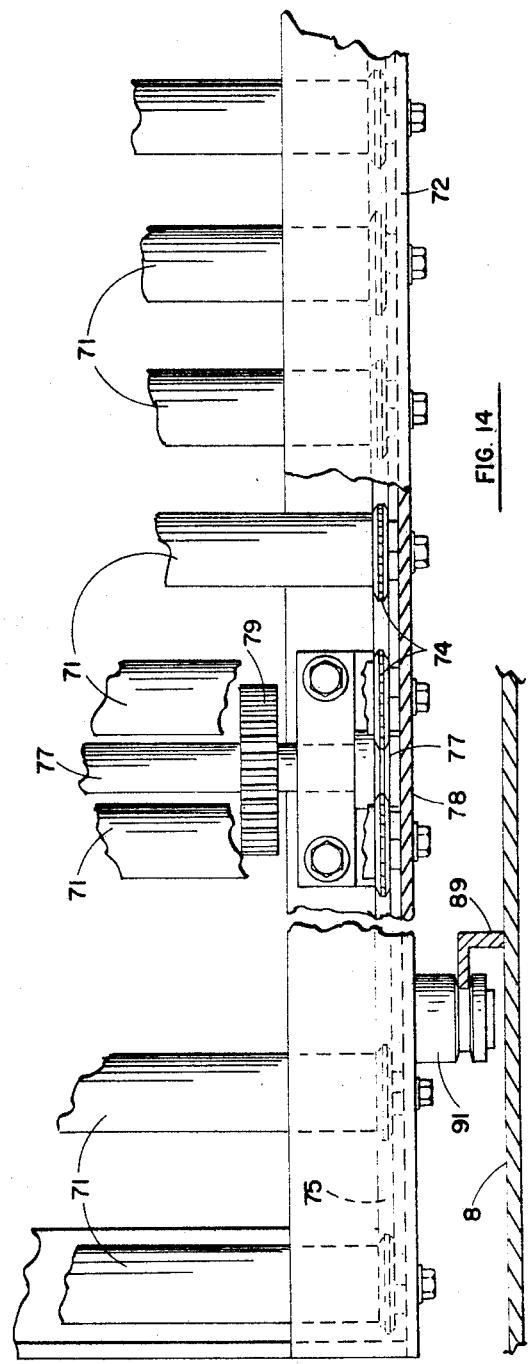
FIG. 14 is an enlarged fragmentary plan view of the load lowerator drive rollers and drive means.
Figure 17:
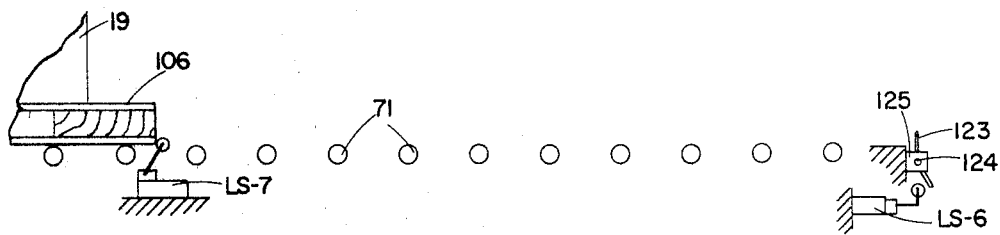
Figure 18:
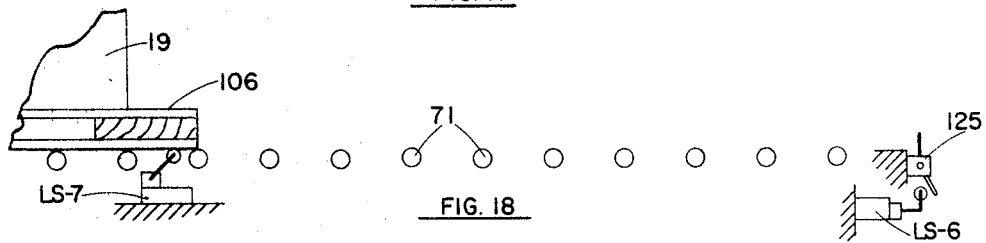
Figure 19:
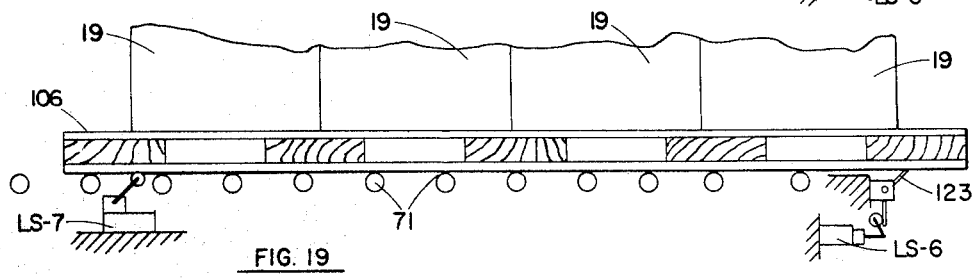

As shown in FIG. 14, a pair of parallel, oppositely faced, L-shaped guide members 88 and 89, are secured to the frame side plate 8. Spool rollers 90 and 91 secured to the side plate 72 of the frame engage the guide members in order to prevent horizontal displacement of the frame.

Referring to FIGS. 15 and 16, a stop roller 92, which extends above the plane of repose of pallets or containers, as the case may be, on rollers 71 is journaled for rotation in the side pivot plates 93. These plates are in turn pivoted for movement about pivot pin shaft 94, which is in turn secured to the lateral frame 51 of the lowerator by means of the L plate 95. Secured to the side pivot plates on the side of the pivot pin shaft 94, opposite to that of the stop roller 92 is a counter weight shaft 96.

An overrun counter weight shaft 97 is positioned exteriorly of the counter weight shaft 96. This shaft is provided with a radial slot 98 in each of its ends. Secured to each of the pivot end plates 93 is the overrun pin 99, which rides in the radial slot 98 on each side of the shaft. In its normal position, the overrun counter weight shaft rests on the lateral frame 51.

Figure 20:
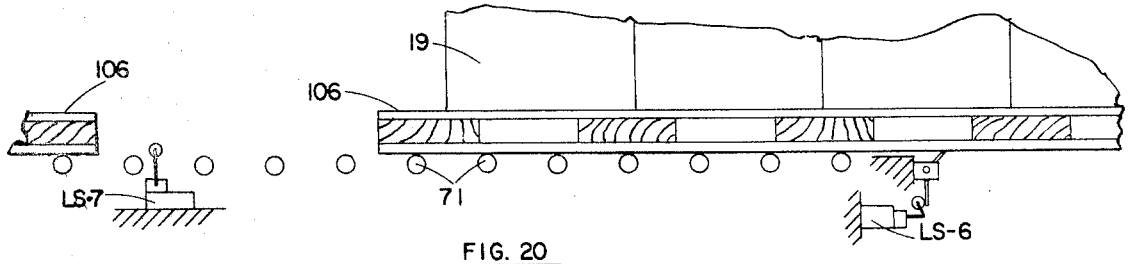
Figure 21:
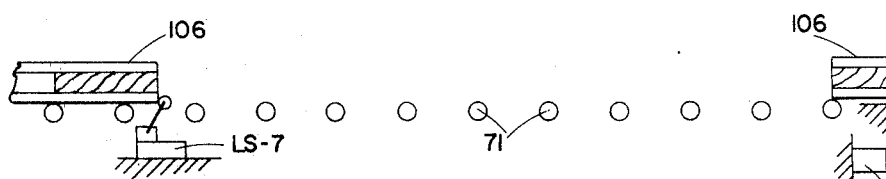
Figure 22:
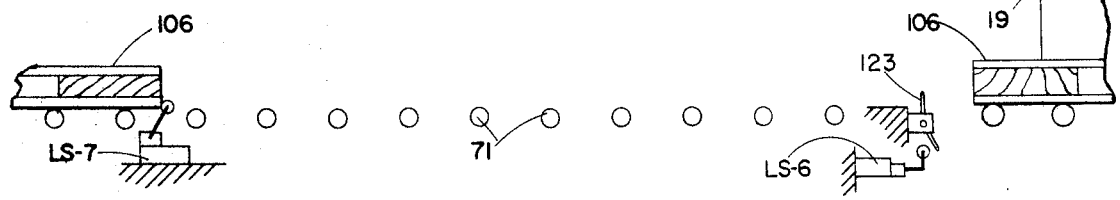

The weights and respective locations of the counter weight shafts 96 and 97 are so adjusted as to provide a moment of force about the axis of pivot pin shaft 94, which is sufficient to cause an empty pallet to be stopped against the stop roller 92 and retained in the position shown in FIGS. 21 and 22, even when the load lowerator rollers 71 are being driven. The representations of FIG. 20 through 22 are, as already noted, schematic; the roller 92 being represented for illustrative purposes only as being the roller of the feeler arm of the limit switch LS 7.

However, the weights and locations are such that an empty pallet will cause the stop roller to be pivoted clockwise about the axis of pivot pin shaft 94 so that the overrun pins 99 rest against the upper surface of the radial slots 98, as shown in FIG. 15. In this position, the limit switch LS 7 is actuated to a closed position of the contacts of that switch.

The weight and location of the counter weight shafts 96 and 97 must also be such that the resulting moment of force is insufficient to retain a loaded pallet in position against the stop roller 92 when the rollers 71 of the load lowerator are being driven. However, the stop roller will retain the loaded pallet in position when the rollers 71 are not being driven.

Referring to FIG. 3, the pallet lowerator assembly 5 is not disclosed in detail since a suitable pallet delivery structure is disclosed in U.S. Pat. No. 3,231,131. However, in the prior art, pallet lowerator and load lowerator elevator assemblies were seperately actuated and driven by a separate series of switches and motors. In our invention, the pallet lowerator and the load lowerator are snychronously raised and lowered so that a pallet can be positioned for delivery to the load lowerator section of the palletizer at the same time as a fully-loaded pallet is positioned for discharge from the palletizer. Of course the pallet lowerator and the load lowerator can travel over different distances.

Figure 4:
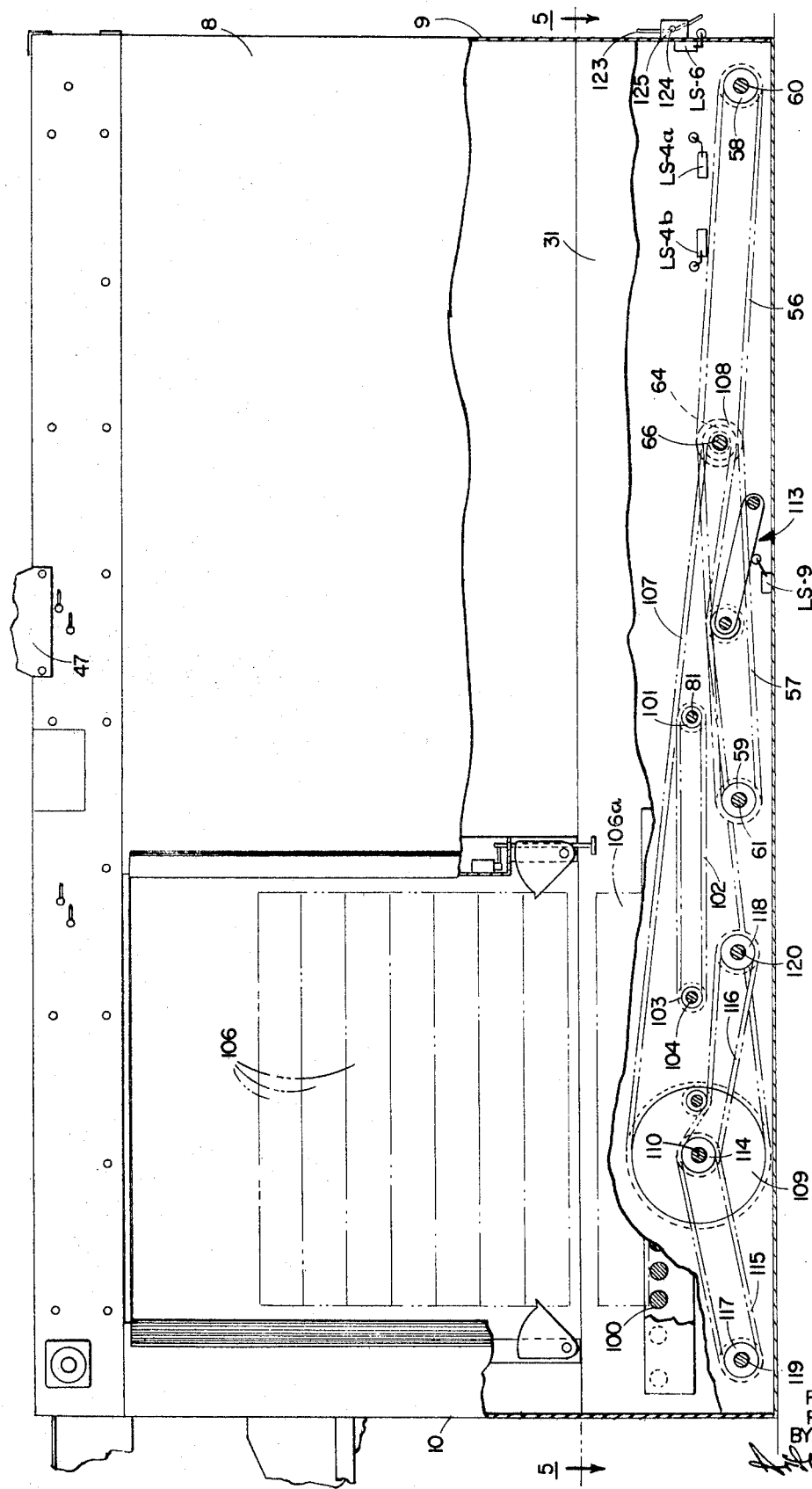
FIG. 4 is a side elevation of our palletizer with parts cut away and omitted for clarity.
Figure 5:
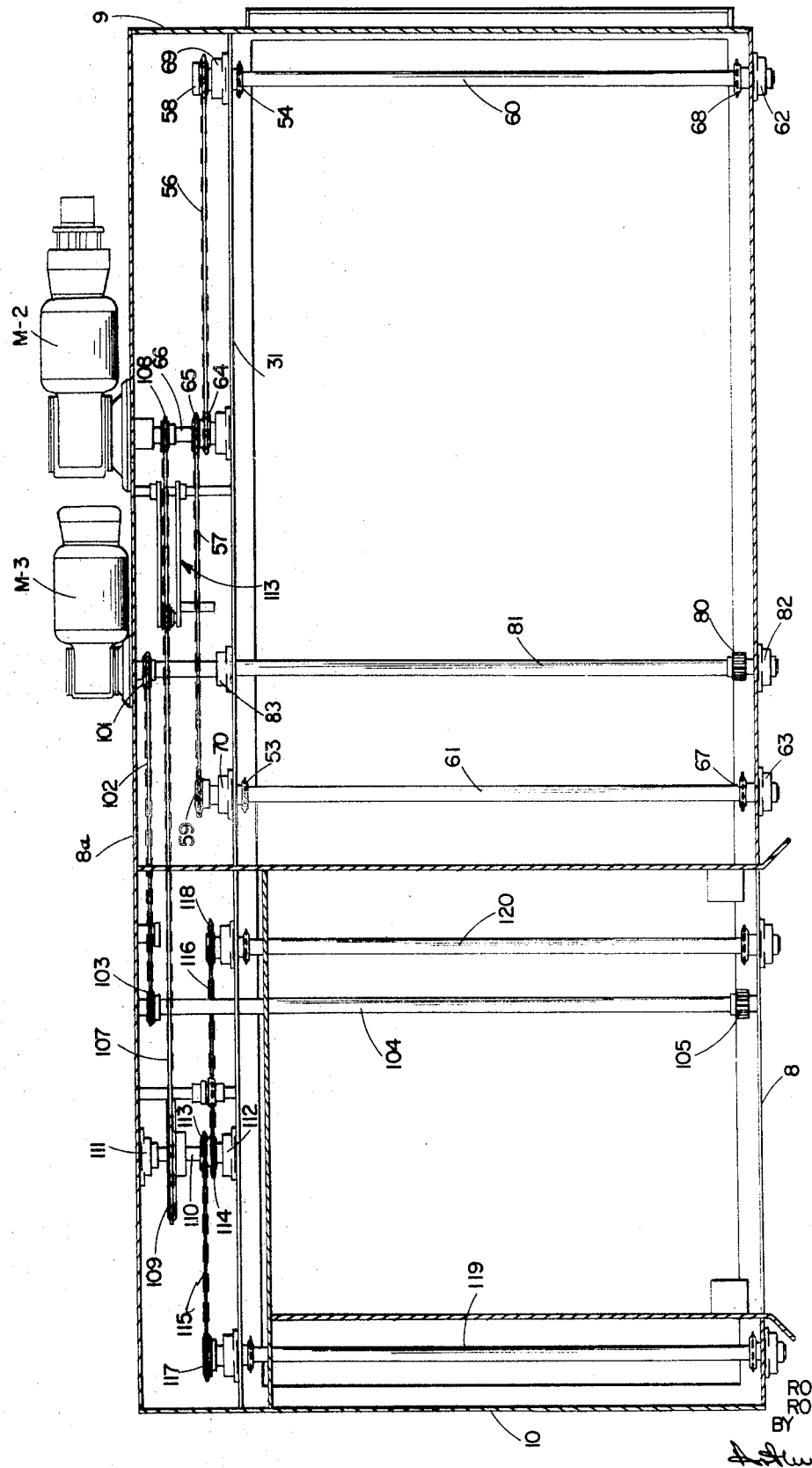
FIG. 5 is a section taken on the lines 5—5 of FIG. 4.

As will be seen from FIGS. 4 and 5, the palletizer rollers 100 are driven by pallet conveyor motor M–3 through sprocket 101, which is secured to the shaft 81, drive chain 102, sprocket 103, drive shaft 104 and drive gear 105. The palletizer rollers 100 are driven with the same type of drive mechanism as is shown in FIG. 13 for the load lowerator. It will be seen that since drive shafts 81 and 104 are in the same horizontal plane that the drive rollers for the pallet lowerator and the drive rollers for the load lowerator will be activated at the same time by the pallet conveyor motor.

As can be seen from FIG. 4, the individual pallets 106 are stacked on the pallet lowerator assembly within the pallet hopper section of the machine. The lowermost pallet 106a rests upon the palletizer rollers 100. The operation of the palletizer section is the same as that illustrated in U.S. Pat. No. 3,231,131, except that the pallet lowerator is driven, as shown in FIG. 5, by the load lowerator motor M–2, by means of drive chain 107. This chain engages the sprocket 108, which is secured to the drive shaft 66 of motor M–2 and engages the sprocket 109, which is secured to the stub shaft 110 journaled for rotation in bushings 111 and 112, which are affixed to the side plate 8a and intermediate plate 31.

Depending upon the respective heights of travel of the pallet lowerator and load lowerator, the tooth ratio of sprockets 109 and 108 is adjusted to provide for synchronous bottom to top and return motion of the pallet lowerator and the load lowerator.

Drive chain 107 may be provided with a pivoted spring-urged idler sprocket assembly 113, which maintains the drive chain 107 taut and which also serves to actuate a limit switch LS9 to open that switch and interrupt the load lowerator motor M–2 in the event of malfunction in the system imposes an excessive load on drive chain 107.

Secured to the stub shaft 110 are sprockets 113a and 114, which respectively engage drive chains 115 and 116. The latter chains respectively drive sprockets 117 and 118 secured to the ends of pallet lowerator drive shafts 119 and 120.

Sequencing of the forward and reverse coils of the stripper plate motor, up and down coils of the load lowerator motor, and the forward drive coils of the pallet conveyor motor is accomplished by a plurality of limit switches each of which generally has a roll feeler arm, which is activated to close or open a particular circuit by a particular lug or by contact with a frame or plate.

Limit switches LS1 and LS2 are secured to the intermediate side plate 31a at locations such that the roller feelers of said switches are disposed adjacent to butt out of contact with the surface of stripper plate 28. Limit switch LS1 may be located in any convenient position within the lateral confines of the home position of the stripper plate so long as the lug 121 that activates limit switch LS1 is disposed immediately below and in contact with the roller feeler of this limit switch.

Limit switch LS2 is secured to the intermediate plate 31a in such a manner that the roller feeler of this switch is positioned in a different transverse plane than the roller of limit switch LS1. The lug 123a that contacts limit switch LS2 is secured to the stripper plate 28 adjacent the ejector rake end of said plate. Limit switch LS2 is positioned adjacent to the opposite end of the stripper plate when it is in its home position.

Limit switches LS4a and LS4b are secured to the intermediate side plate 31. These limit switches are so positioned as to contact the load lowerator frame at its downmost position. These limit switches are activated by contact with the frame.

Limit switch LS5 is secured to a plate 31b, which depends from and is attached to the intermediate plate 31a, adjacent to the upper end of one of the load lowerator drive chains 53 and is actuated by the lug 122. This lug is secured to the drive chain in such a location that the lug contacts the roller feeler of limit switch LS5 at any time after the last layer has been placed on the palletizer and prior to the load lowerator frame contacting limit switches LS4a and LS4b. The position of limit switches LS4a, LS4b and LS5 as well as the position of the load lowerator can best be seen in FIGS. 23 through 25.

Limit switch LS6 is secured to the palletizer frame at the lower eject end thereof. Also secured to the lower eject end of the palletizer frame is the pivoted flapper plate 123. The upper end of this plate extends above the plane of repose of a loaded pallet on the load lowerator rollers. This plate is pivoted at each of its ends by pins 124 to the support plates 125, which are secured to the end plate 9.

Limit switch LS8 is secured to the plate 31b in any convenient position to contact the load lowerator frame at its uppermost position.

Limit switch LS9 is a safety switch. Additional safety switches may be positioned in the palletizer as may be desired.

Referring to FIG. 26, after the master switch 200 is turned on to energize the circuit, and after the first complete tier or layer is formed by the palletizer operator, the eject layer button is pushed, closing contacts 201 and 202 and providing for current flow through these contacts, contacts 203 and 204 of pallet conveyor motor relay M-3, then through the contacts 205-206 of limit switch LS3, contacts 207-208 of limit switch LS2, contacts 209-210 of the stripper plate motor relay 223, and to the forward direction coil 211 of the stripper plate motor. Current also flows to the forward direction relay solenoid 211a and activates the relay to close the contacts 212 and 213, through the closed contacts 207 and 208 of limit switch LS2, back through contacts 209 and 210 of the stripper plate motor relay to supply current continuously to the forward coil 211 of the stripper plate motor. Current is also simultaneously supplied to the relay solenoid coils 211a of relay M-1f to maintain the contacts 212 and 213 closed.

As soon as the stripper plate moves forwardly slightly, the roller feeler of limit switch LS1 is released by the actuating lug 121 for that switch, and contacts 218 and 219 are closed, while contacts 226 and 227 are open. This is a preliminary switch action, necessary to a subsequent reversing action of the stripper plate motor.

The stripper plate continues to advance until the lug 123, located adjacent the ejector rake, contacts the limit switch LS2 and causes contacts 207 and 208 to open, thus interrupting the flow of current through contacts 209-210 by opening contacts 207 and 208 to the solenoid coils 211a of relay M-1f and thus opening contacts 212 and 213 and closing contacts 220-221. Current then flows through the contacts 214 and 215 of the limit switch LS2, through the contacts 216 and 217 of the load lowerator motor relay M-2u, through the contacts 218 and 219 of limit switch LS1, and then through contacts 220 and 221 of the stripper plate motor relay M-1f to the reverse coil 222 of the stripper plate motor M-1 and to the reverse solenoid coil 223 of the relay M-1r to close the contact 210a-212a. Closing the contacts 210a-212a results in continuing the supply of current from 210a through 212a, through contacts 218-219 of limit switch LS1, through the contacts 220 and 221 and to the reverse coil of the stripper plate motor M-1.

When the stripper plate returns to its original position, the limit switch LS1 actuating lug 121 contacts the roller feeler on that limit switch and opens contacts 218-219 to interrupt the current flowing to the reverse coil of the motor and to the reverse solenoid coil, thus returning the relays to the position shown in FIG. 26.

As the stripper plate advances, carrying with it the containers 19, pendant plate 49 is actuated to cause limit switch LS3 to close contacts 224-225 and open contacts 205-206. Current can then flow through contacts 226-227 of the limit switch LS1 through contacts 224-225 of limit switch LS3 through contacts 241-242 of the limit switch LS4a and the contacts 230-231 of the limit switch LS4b through the contacts 232-233 of the load lowerator motor relay M-2u and to the down direction coil 235 of the load lowerator. At the same time, current flows into the solenoid coil 234 of the M-2d relay closing contacts 236-237.

As soon as the load has lowered to the point that the pendant plate 49 is back in its normal position, the limit switch LS3 opens the contact 224-225 and the downward motion of the load lowerator stops.

When a complete load has been "made up" and the roller leaf of the load lowerator down position stop limit switch LS4a has been contacted, the contacts 241-242 of that limit switch are opened and current no longer flows to the down coil 235 of the load lowerator motor M-2.

When the frame of the load lowerator reaches its down position it also contacts the roller leaf of limit switch LS4b, closing contacts 243-244 and opening contacts 230-231. Current now flows through the 243-244 contacts through contacts 245-246 of load lowerator motor relay M-2u to the pallet conveyor motor coil 147. As will be seen, actuation of the pallet conveyor motor results in actuation of the rollers 71 of the load lowerator and the rollers 100 of the pallet lowerator.

Current also flows to the solenoid coil of the relay 148, closing contacts 249-250 so that current then flows to the solenoid of control relay CR1, closing this relay and at the same time permitting current to flow through contacts 252-254 to the coil of control relay CR1, to maintain this relay closed.

Once the contacts 252-253 have been made, current will continue to flow to the coil of control relay CR1 so long as contacts 280-281 are maintained closed.

It will be noted that the solenoid of the control relay CR2 was initially activated to a closed position when the limit switch LS5 was closed by the downward movement of the load lowerator elevator and the momentary contact of lug 122 with this switch.

Thus, relays CR1 and CR2 are in a closed contact position opposite to that shown in FIG. 26 when the load lowerator is in its fully down position and the pallet conveyor motor M-3 is operating.

As soon as the loaded pallet crosses the feeler vein 123 and activates limit switch LS6 to an open position, current through contacts 260-261 is interrupted and current no longer flows through contacts 295–296 of control relay CR2 and current to the solenoid coil of that relay is interrupted, thus returning the relay to its normal position as shown in FIG. 26.

It is noted that limit switch LS7 is a maintain open contact switch so that so long as no pallet, whether loaded or unloaded, is in contact with the roller 92 of the pivot arm 93 as seen in FIG. 15, no current will flow through the conductor carrying limit switch LS7. As previously described, an empty pallet will not override the stop roller 92 but will remain in position, maintaining the limit switch LS7 closed.

As soon as limit switch LS6 is returned to a closed position by a loaded pallet exiting completely from the palletizer, current flows through contacts 262–263 of the limit switch LS7, through contacts 264–265 of control relay CR1, then through contacts 266–267 of control relay CR2, through contacts 268–269 of normally closed contact limit switch LS8, through contacts 270–271 of safety switch LS9, through the contacts 274–275 of the motor relay switch M–2d and to the up coil 276 of the load lowerator motor M–2. At the same time, current goes to the coil 290 of this motor and actuates the relay M–2u to a closed position (opposite to that shown in FIG. 26). It will be seen that the conductor including contacts 243–244 and contacts 245–246 is open, thus interrupting the flow of current to the pallet conveyor motor M–3 and to the coil 248 of relay M–3 of that motor. The relay M–3 of coil 248 thus returns to the position in FIG. 26 interrupting the flow of current through contacts 249–250 and to the coil 251 of control relay switch CR1. In the resulting position of control relay CR1, opposite to that shown in FIG. 26, current can flow through the contacts 277–278 and then through the contacts 291–279, through limit switches LS8 and LS9, and through the relay M–2d to the up coil 276 of the load lowerator motor. At the same time the relay M–2a is maintained in the position opposite to that shown in FIG. 26.

When the load lowerator frame reaches its uppermost position and contacts limit switch LS8 to open it, current through the previously described path is interrupted and the load lowerator motor M–2 stops. The motor relay switch M–2u is concurrently returned to its normal position as shown in FIG. 26.

At that point a new cycle can be initiated.

In order to eject a partial load from the machine and deliver a new unloaded pallet to the load lowerator section, the eject partial load switch is closed, thus closing contacts 182–183 and supplying current to the coil 131 of control relay CR2.

Current will also be supplied through limit switch 4a, contacts 131–132 of limit switch LS4b and contacts 132–133 of the load lowerator motor coil to the downside of load lowerator motor coil 135 to initiate downward motion of the load lowerator. This will also supply current to the motor relay down coil 134 closing relay M–2d to a position opposite to that shown in FIG. 26, thus maintaining current to the down coil of the load lowerator motor as described above.

The remaining sequences will be similar to those for normal ejection of a loaded pallet.

OPERATION

To initiate operation of our machine, an empty pallet is placed on the load lowerator section of the palletizer resting against the limit switch LS7, and the pallet hopper is supplied with empty pallets. The load lowerator is in the fully up position.

The operator then turns the paletizer on and proceeds to accept delivery of articles or cases 19 from the conveyor 6. He forms a row of cases on the ball deck 1, rotating alternative boxes or such boxes as may be desired to form the desired pattern. The operator then transfers the row of cases onto the layer build up deck by means of the manual eject or pusher bar 14.

The operator repeats the steps of forming a row of cases and ejecting them onto the layer build up deck 2 until a complete layer of cases is formed on the deck. He then presses the "eject layer" button. This results in the stripper plate 28 being driven forward and the ejector rake arms 36 extending to their full up position as they are released by stop or stub rods 40. The pusher plates 37 of ejector rake arms 36 then contact the last row of cases and drive the whole layer of cases forward over the friction stop strips 24 and over the rollers 27 onto the stripper plate 28. When the stripper plate has reached its fully-extending position limit switch LS2 is contacted by the lug 123a and the stripper plate motor M–1 reverses to return this plate to its home position. As the stripper plate moves back to its home position, it slides out from under the layer of cases which are restricted from returning with the stripper plate by the rollers 27, which are above the bottom plane of the cases.

It is to be noted that as soon as the operator has pressed the "eject layer" button, he is free to return to making up a new layer of cases by forming the individual rows as above. Even though there may be a row or two of cases out on the layer buildup deck during the time the stripper plate is returning to its home position, it can do so without interference. The rake arms are then urged to a down position by the cases as they pass under them. It will be seen that the rake arms are yieldingly retained in their extended positions by the spring and that the tension of the spring is overcome when the rake arms are contacted by the articles as the stripper plate is withdrawn.

This is an important feature of our invention since it permits the operator and machine to work continuously without waiting for the stripper plate to return to its home position before the operator can make up a new layer of cases.

When the stripper plate returns to its home position, limit switch LS1 is contacted by the lug 121 and motor M–1 stops. At the same time, load lowerator motor M–2 is activated to drive frame 51 downwardly until the pendant plate 49 returns to its home position at which time motor M–2 stops and a new eject layer cycle can be repeated.

After the topmost layer of cases has been ejected onto the stack of cases and the load lowerator has moved downwardly past contact of limit switch LS5 by lug 122, the frame 51 contacts limit switches LS4a and 4b to stop the load lowerator motor M–2 and start the pallet conveyor motor M–3. The rollers 100 and 71 are driven by this motor to eject the loaded pallet from the machine onto a suitable conveyor or other surface and to deliver an empty pallet to the load lowerator.

When the loaded pallet has passed limit switch LS6 and an empty pallet is in position against the stop roller 92, motor M–2 is activated to raise the empty pallet until the frame 51 contacts limit switch LS8 to stop the load lowerator in its uppermost position. The pallet loading cycle can then be repeated.

However, the operator can continue to make up a new layer of cases on the layer buildup deck while the fully loaded pallet is being ejected from the machine and an empty pallet placed in receiving position. Similarly, additional pallets may be delivered to the pallet hopper from time to time without interrupting the operations of the palletizer or the operator. Consequently, both machine and operator can function at maximum efficiency.

The pallet lowerator operates synchronously in its up and down travel with the load lowerator. The functioning of the load lowerator is as shown and described, for example, in U.S. Pat. No. 3,231,132. However, since the pallet lowerator is driven by the same motor, M–2, as drives the load lowerator, through the sprockets 108 and 109 by chain 107, the vertical position of the pallet lowerator and the position of the dogs shown in U.S. Pat. No. 3,231,132 will depend upon the vertical location of the load lowerator.

It will be seen from the foregoing description that the palletizer of our invention, while being of relatively simple structure in comparison with other palletizers, is capable of providing rapid, efficient palletizing operations. It will also be noted that various changes may be made in the specific structure disclosed without departing from the functional advantages gained by our invention.

Although we have described the features of our invention as specifically applied to a semi-automatic palletizer, it will be clear to those skilled in the art that these features are well adapted to use in automatic palletizers and in case stackers. The former require incorporation of row and layer pattern forming apparatus for automatically making up a patterned layer of articles or for making up layers of articles having alternate patterns prior to or in conjunction with operation of our layer build up deck. On the other hand, article stackers do not require apparatus for delivering pallets. It will be evident that an article stacker embodying the features of our invention need not include a pallet lowerator or automatic pallet delivery apparatus or any load lowerator structure capable of delivering a stack from the machine.

While the preferred embodiment of our invention has been described in detail, it will be evident that our invention is not limited to the particular construction shown, and it is hereby intended to cover all modifications, variations, adaptations, and uses thereof which come with the practice of those skilled in the art to which our invention relates and the scope of the appended claims.

We claim:

1. A machine for forming a layer of articles and transferring said layer from one surface to another surface comprising:
a frame,
a plurality of spaced parallel rows of elongate elements secured to said frame, each of said elements having secured thereto a plurality of rotatable members and forming a low-friction surface;
a stripper plate mounted on said frame adjacent to and on the opposite side of the rotatable member surface of said elements, said plate being mounted on said frame for extension beyond said elements and retraction adjacent thereto;
a plurality of arms pivotally mounted to one end of said plate and extending between said elements;
resilient means urging said arms into extension between said elements;
first stop means restraining said arms in an extended position between said elements;
second stop means secured to one end of said elements restraining said arms in a retracted position below said low-friction surfaces; and
drive means mounted on said frame for extending said stripper plate beyond said elements and retraction adjacent thereto.

2. The machine of claim 1 wherein said elongate elements have a friction stop strip secured thereto at the end thereof opposite from the end of attachment of said arms to said plate, said stop strip having its surface above said low-friction surface.

3. The machine of claim 2 that further comprises a stack support elevator mounted in said frame adjacent the end of said elements to which said strip is secured, said elevator having an article support surface and means for moving said surface incremental distances equal to the height of articles being stacked and for returning said surface to a position adjacent to and below the extended position of said stripper plate.

4. A machine for stacking a plurality of layers of articles comprising:
a frame;
a plurality of rows of spaced, parallel, elongate, substantially horizontal elements secured to said frame,
a plurality of rotatable members mounted in said elements and defining a low-friction surface;
a substantially rectangular plate mounted in said frame adjacent to and below said elongate elements and extensible in said frame;
a plurality of arms pivoted to said plate at one end thereof and extensible between said rows of elements;
first stop means connected to said plate for restraining said arms in an extended position between said rows;
resilient means urging said arms against said first stop means;
second stop means restraining said arms against extension above said low-friction surface;
an elevator mounted in said frame adjacent to the end of said plate which is opposite to the end to which said arms are secured, said plate being extensible over said elevator;
drive means for raising said elevator to a position of close adjacency to said stripper plate when in its extended position and for lowering said elevator;
means for extending said plate over said elevator and withdrawing it therefrom; and
means for activating said last mentioned means and said drive means to successively extend said plate over said elevator, withdraw said plate therefrom, lower said elevator a distance equal to the height of articles being stacked and repeat said cycle until the stack has been made up.

5. The machine of claim 4 which further comprises:
a pallet storage hopper in said frame having a pallet elevator on which empty pallets can be placed;
pallet drive means for raising and lowering said pallet elevator;
means connecting said drive means of claim 4 with said pallet drive means to drive both said means synchronously;
means to deliver an empty pallet to said elevator at the same time as a pallet containing a stack of articles is delivered from said elevator; and
means to activate said drive means to raise the elevator to its uppermost position and to stop it there.

6. In a palletizing machine having a frame, a low-friction layer buildup deck secured thereto, a rectangular stripper plate disposed adjacent to said deck, a plurality of stripper arms extensible through said deck and pivoted to said plate, an elevator adjacent to said deck, secured to said frame for receiving articles from said plate, and a pallet elevator for storing empty pallets to be delivered singly to said elevator; common first drive means for raising and lowering said elevator and said pallet elevator synchronously, second drive means for extending said plate over said elevator and withdrawing it to its position adjacent said deck, third drive means for conveying an empty pallet from said pallet elevator to said elevator and for conveying a full pallet out of said palletizing machine, and switching means to successively extend said stripper plate closely adjacent to a pallet on said elevator, to withdraw said stripper plate, to lower said elevator to a new position at a distance below the original position equal to the height of the article it is desired to stack, to repeat the foregoing successive steps until the last layer of articles is placed on said pallet, to activate said third drive means to deliver an empty pallet to said elevator and convey the full pallet out of said palletizing machine, and to raise said elevator carrying an empty pallet to its uppermost position.

7. A machine for stacking a plurality of layers of articles comprising:
a low-friction deck to receive a layer of articles to be stacked on a pallet, and having stop means at the ejection end thereof for articles placed thereon;
a stripper plate adjacent to and below said low-friction deck;
a pallet support deck having means for raising and lowering said deck, said support deck, in its uppermost position, being adjacent to said low-friction deck;

a pallet storage hopper for storing a plurality of pallets and having means for delivering a single one of said pallets to said pallet support deck;

means for simultaneously ejecting a layer of articles from said low-friction deck and extending said stripper plate from under said deck and over said pallet support deck to receive said layer of articles;

means for raising said pallet support deck to a position adjacent to and below the extended position of said stripper plate and for successively lowering said pallet support deck a distance at least equal to the height of said layer of articles after each layer has been placed on said pallet;

said pallet storage hopper including a pallet storage deck and means for raising and lowering said storage deck; and means for synchronously moving said storage deck and said support deck to deliver said storage deck and said support deck to their bottom-most positions in a common plane at the same time and for moving a fully-loaded pallet off of said support deck and for simultaneously moving an empty pallet from said storage deck to said support deck.

8. A machine for stacking a plurality of layers of articles comprising:

a low-friction deck to receive a layer of articles to be stacked on a pallet, and having stop means at the ejection end thereof for articles placed thereon;

a stripper plate adjacent to and below said low-friction deck;

a pallet support deck having means for raising and lowering said deck, said support deck, in its uppermost position, being adjacent to said low-friction deck;

a pallet storage hopper for storing a plurality of pallets and having means for delivering a single one of said pallets to said pallet support deck;

means for simultaneously ejecting a layer of articles from said low-friction deck and extending said stripper plate from under staid deck and over said pallet support deck to receive said layer of articles;

means for raising said pallet support deck to a position adjacent to and below the extended position of said stripper plate and for successively lowering said pallet support deck a distance at least equal to the height of said layer of articles after each layer has been placed on said pallet; and an additional low-friction deck mounted substantially in the same plane as said first mentioned low-friction deck and on the opposite side thereof from said pallet support deck, and a horizontal bar pivotally mounted exteriorly of said additional low-friction deck whereby a single row of said articles may be pushed by said bar onto said first mentioned low-friction deck.

9. A machine for stacking a plurality of layers of articles comprising:

a low-friction deck to receive a layer of articles to be stacked on a pallet, and having stop means at the ejection end thereof for articles placed thereon;

a stripper plate adjacent to and below said low-friction deck;

a pallet support deck having means for raising and lowering said deck, said support deck, in its uppermost position, being adjacent so said low-friction deck;

a pallet storage hopper for storing a plurality of pallets and having means for delivering a single one of said pallets to said pallet support deck;

means for simultaneously ejecting a layer of articles from said low-friction deck and extending said stripper plate from under said deck and over said pallet support deck to receive said layer of articles;

means for raising said pallet support deck to a position adjacent to and below the extended position of said stripper plate and for successively lowering said pallet support deck a distance at least equal to the height of said layer of articles after each layer has been placed on said pallet; and said stop means comprises a plurality of friction stop strips for said containers, secured in said low-friction deck at the ejection end thereof and disposed just above the plane of contact of said containers with said low-friction deck.

10. A machine for stacking a plurality of layers of articles comprising:

a low-friction deck to receive a layer of articles to be stacked on a pallet, and having stop means at the ejection end thereof for articles placed thereon;

a stripper plate adjacent to and below said low-friction deck;

a pallet support deck having means for raising and lowering said deck, said support deck, in its uppermost position, being adjacent to said low-friction deck;

a pallet storage hopper for storing a plurality of pallets and having means for delivering a single one of said pallets to said pallet support deck;

means for simultaneously ejecting a layer of articles from said low-friction deck and extending said stripper plate from under said deck and over said pallet support deck to receive said layer of articles;

means for raising said pallet support deck to a position adjacent to and below the extended position of said stripper plate and for successively lowering said pallet support deck a distance at least equal to the height of said layer of articles after each layer has been placed on said pallet; and said low-friction deck including a plurality of elements, each having a plurality of rotatable members on which said articles may move, said elements having secured to one end thereof a friction stop strip, said strip having its surface lying just above the plane of contact of articles on said rotatable members, and said means for simultaneously ejecting a layer of articles from said low-friction deck and extending said stripper plate comprises a plurality of rake arms pivoted to the end of said stripper plate to a stop position extended between said elements, means for urging said arms upwardly between said elements, to said stop position, means restraining said arms in a position below the level of said deck when said stripper plate is in its retracted position under said deck, drive means for moving said stripper plate horizontally out from under said deck and back to its home position, and switch means to activate said drive means.

11. A machine for stacking a plurality of layers of articles comprising:

a low friction deck to receive a layer of articles to be stacked and having stop means at the ejection end thereof for articles placed thereon;

a stripper plate adjacent to and below said deck;

a stack support deck to receive successive layers of said articles adjacent to the ejection end of said stripper plate;

means for lowering said stack support deck successive distances at least equal to the height of a layer of said articles;

means for extending said stripper plate and simultaneously pushing a layer of articles onto said plate as it extends over said stack support deck;

means for withdrawing said stripper plate from under said layer of articles to deliver said layer to said stack support deck; and said low-friction deck having stop means at the ejection end thereof and comprises a plurality of substantially parallel spaced rows of bearing members inclined from the horizontal, each of said rows having secured to an end thereof a friction strip whose surface is above the plane of contact of said article with said bearing members and said means for extending said stripper plate and simultaneously pushing a layer of articles onto said plate comprises a chain secured to said plate, drive means for said chain, a plurality arms pivotally mounted at one end of said plate and urged against stop means to extend above said plane of contact between said spaced rows of bearing members, and means to restrain said arms below the plane of the article contact surface of said bearing members when said stripper plate is in its fully retracted position.

12. In a machine for stacking a plurality of layers of articles, the combination of:
   a supporting structure;
   a makeup deck on said supporting structure for receiving at least one layer of the articles, said makeup deck having an ejecting end;
   friction stop means adjacent said ejecting end for stopping the articles to form said one layer;
   platform means mounted on said supporting structure for movement along a first path having a substantial horizontal component between an advanced position in which said platform means is adjacent said ejecting end of said makeup deck and a retracted position;
   means for moving said platform means between said advanced and retracted positions thereof;
   means for overcoming said friction stop means and moving the layer of articles along a second path having a substantial horizontal component from said makeup deck to said platform means as said platform means is moving toward said advanced position thereof;
   a stacking deck mounted on said supporting structure for up and down movement adjacent said ejecting end of said makeup deck, said stacking deck having an upper position beneath said platform means in the advanced position thereof;
   means adjacent said ejecting end for preventing movement of the layer of articles to the retracted position when said platform means is moved from said advanced position to said retracted position whereby movement of said platform means to the retracted position removes the layer of articles therefrom and deposits them on the stacking deck; and
   means for lowering said stacking deck from said upper position for a distance sufficient to allow movement of said platform means to said advanced position without substantially interfering with the layer of articles on said stacking deck.

13. In a machine for stacking a plurality of layers of articles, the combination of:
   a supporting structure;
   a makeup deck on said supporting structure for receiving at least one layer of articles, said makeup deck having an ejecting end and including stop means intermediate the ends of said makeup deck adjacent said ejecting end for stopping the articles to form said one layer on said makeup deck;
   platform means mounted on said supporting structure for movement along a first path having a substantial horizontal component between an advanced position in which said platform means is adjacent said ejecting end of said makeup deck and a fully retracted position;
   means for moving said platform means between said advanced and fully retracted positions thereof;
   means for moving the layer of articles along a second path having a substantial horizontal component from said makeup deck to said paltform means when said platform means is on said first path and is out of said fully retracted position thereof;
   a stacking deck mounted on said supporting structure for up and down movement adjacent said ejecting end of said makeup deck, said stacking deck having an upper position located beneath said platform means in the advanced position thereof;
   means for preventing movement of the layer of articles to the fully retracted position when said paltform means is moved from said advanced position to said fully retracted position whereby movement of said platform means to the fully retracted position removes the layer of articles therefrom and deposits them on the stacking deck;
   means for lowering said stacking deck from said upper position to a next lower position which is sufficiently low to allow movement of said platform means to said advanced position without movement without substantially interfering with the layer of articles on said stacking deck; and
   said stop means including friction stop means for stopping said layer of articles with the force of friction therebetween and said means for moving the layer of articles to said platform means, moves the layer of articles with sufficient force to overcome said force of friction.

14. In a machine for stacking a plurality of layers of articles, the combination of:
   a supporting structure;
   a makeup deck on said supporting structure for receiving at least one layer of the articles, said makeup deck having an ejecting end;
   platform means mounted on said supporting structure for movement between an advanced position in which said platform means is adjacent said ejecting end of said makeup deck and a retracted position in which said platform means is displaced generally horizontally of said advanced position, said platform means being adapted to have the layer of articles from said makeup deck moved thereon;
   means for moving said platform means between said advanced and retracted positions thereof;
   means for moving the layer of articles from said makeup deck to said platform means;
   a stacking deck mounted on said supporting structure for up and down movement adjacent said ejecting end of said makeup deck, said stacking deck being adapted to carry article unitizing means and having an upper position located beneath said platform means in the advanced position thereof, said stacking deck including a plurality of rollers for supporting the article unitizing means thereon;
   means for preventing substantial movement of the layer of articles on said platform means with said platform means toward said retracted position when said platform means is moved from said advanced position to said retracted position whereby movement of said platform means to said retracted position removes the layer of articles therefrom and deposits them on the article unitizing means;
   means for lowering said stacking deck in increments to a lowermost position to allow successive layers of the articles to be deposited on the article unitizing means;
   means operative when said stacking deck is in said lowermost position for automatically removing said article unitizing means having the layers of articles thereon from said stacking deck and automatically placing another article unitizing means thereon;
   said means for removing and placing including a pallet drive member mounted for movement on said supporting structure;
   at least one of said rollers being engageable with the article unitizing means having the layer of articles thereon for removing the same from the stacking deck and said drive member being engageable with an empty article unitizing means for driving the latter onto the stacking deck;

a single power source; and means for drivingly interconnecting the single power source to said one roller and said drive member whereby said single power source supplies power to remove the loaded article unitizing means from the stacking deck and to drive an empty article unitizing means onto the stacking deck.

References Cited

UNITED STATES PATENTS

| | | |
|---|---|---|
| 1,269,115 | 6/1918 | Reese. |
| 2,397,720 | 4/1946 | Beane. |
| 2,633,251 | 3/1953 | Bruce. |
| 2,686,603 | 8/1954 | Lawson. |
| 2,699,264 | 1/1955 | Bruce et al. |
| 2,981,420 | 4/1961 | Johanson. |
| 3,122,241 | 2/1964 | Lawson. |
| 3,130,839 | 4/1964 | Grasvoll. |
| 3,142,389 | 7/1964 | Bolt. |
| 3,161,302 | 12/1964 | Poindexter et al. |
| 3,263,827 | 8/1966 | Verrinder. |

GERALD M. FORLENZA, Primary Examiner

K. J. SPAR, Assistant Examiner

U.S. Cl. X.R.

198—221